United States Patent Office 3,139,856
Patented July 7, 1964

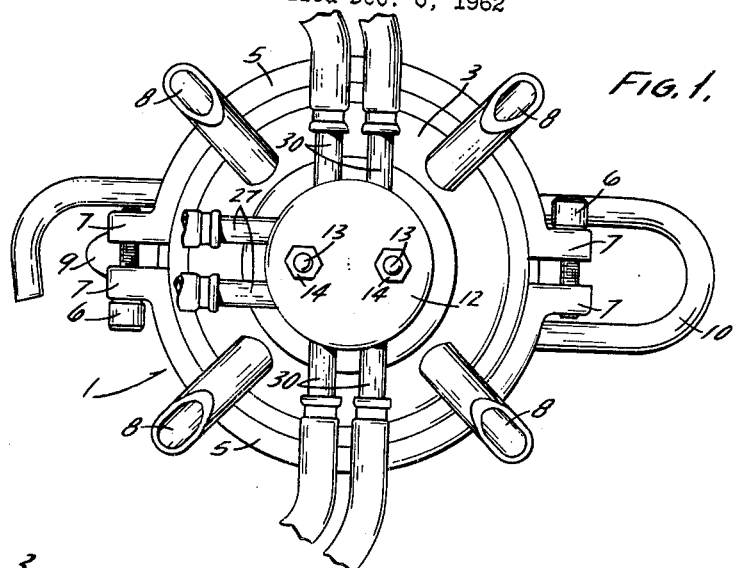
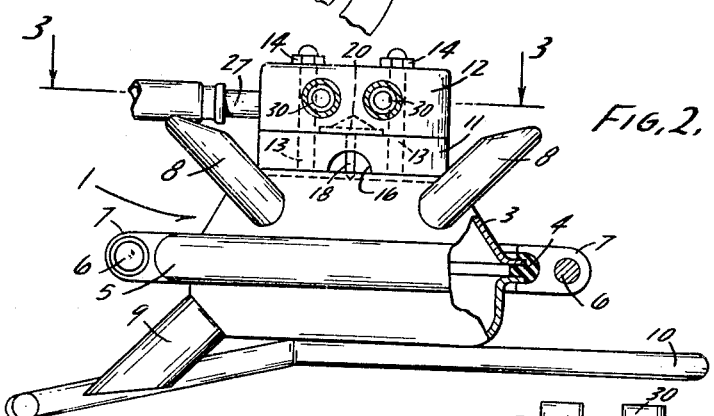
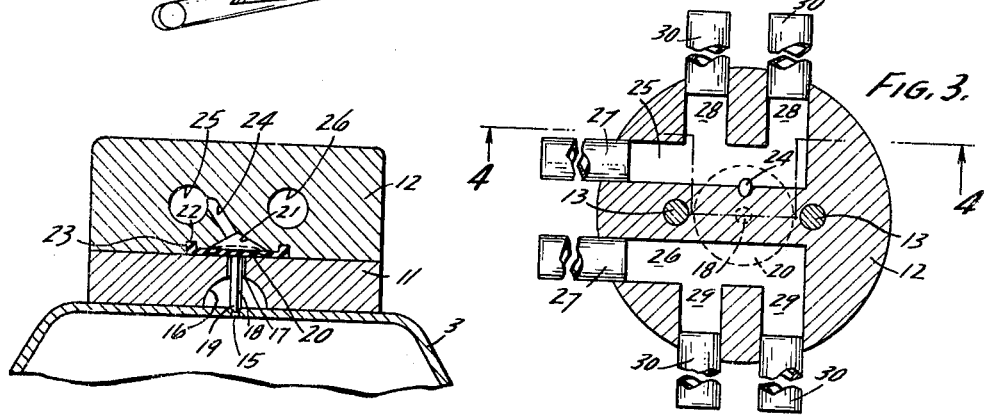
INVENTOR.
DONALD E. LIPPKE
BY
ANDRUS & STARKE
ATTORNEYS.

3,139,856
MILKING APPARATUS
Donald E. Lippke, Delavan, Wis., assignor to Perfection Manufacturing Corporation, Delavan, Wis., a corporation of Minnesota
Filed Dec. 6, 1962, Ser. No. 242,671
4 Claims. (Cl. 119—14.36)

This invention relates to a milking apparatus and more particularly to an apparatus for introducing small amounts of air into the milk passage in synchronization with pulsator operation.

In a pipline milking system, the milk is drawn from the cow's udder through a series of teat cups which are connected to a bowl or claw. The milk passes from the claw through a conduit to a pipline which delivers the milk to a bulk storage station or other delivery point. In the normal pipeline milking system, the pipelines are located above the level of the cows so that the milk is required to be elevated from the claw or bowl to the pipeline. In order to more effectively elevate the milk to the pipeline, it has been proposed to introduce a small amount of air periodically into the milk passageway. Generally, the air is bled or introduced into the milkline in synchronization with the pulsator and the air imparts a dynamic force on the milk to elevate the same as well as providing a more uniform flow of milk through the delivery conduit.

The present invention is directed to an improved air-bleed apparatus for a milking system which introduces a small amount of air into the milk passageway in synchronization with the operation of the pulsator. In general, the apparatus includes a bowl or claw having a series of inlet nipples connected to the teat cups and having an outlet through which the milk is discharged to the pipeline. The upper surface of the claw is provided with an air inlet hole which is in communication with the atmosphere and the air inlet hole is closed off by a valve stem carried by a flexible diaphragm or other pressure responsive member. The diaphragm is mounted within a chamber in a manifold block which is supported on the claw.

The manifold also is provided with a pair of passages which are connected to the pulsator and each passage is also in communication with two inflations of the four teat cups. During operation, one of the passages is alternately subjected to vacuum while the other is subjected to atmospheric pressure.

A port or opening connects one of the passages with the diaphragm chamber and as that passage is subjected to vacuum, the diaphragm is flexed upwardly to draw the valve stem out of engagement with the air inlet hole and thereby permit a small amount of air to bleed into the claw or milk passageway. Thus, with each pulsation, the valve is lifted to introduce a small amount of air into the milk passageway which imparts a force on the milk to aid in elevatting the same to the pipeline.

The present invention is a simple and inexpensive device for bleeding air into the milk passageway which is controlled by the regular pulsating mechanism without additional hoses or connections. The diaphragm operated valve provides a positive opening and closing mechanism which separates the milk zone from the pulsating mechanism so that the milk cannot be drawn into contact with the pulsating mechanism during operation.

The air inlet opening in the claw is covered or shielded so that flies and other insects will not be drawn through the opening during periods when air is passing therethrough.

Other objects and advantages will appear in the course of the following description.

The drawings illustrate the best mode contemplated of carrying out the invention.

In the drawings:
FIG. 1 is a plan view of a claw including the air-bleed mechanism of the invention;
FIG. 2 is a side elevation of the apparatus with parts broken away in section;
FIG. 3 is a section taken along line 3—3 of FIG. 2; and
FIG. 4 is a section taken along line 4—4 of FIG. 3.

The drawings illustrate a milking apparatus including a claw 1 formed of a lower section 2 and upper section 3. The sections 2 and 3 are provided with peripheral flanges and a resilient gasket 4 is located between the flanges to seal the joint therebetween. The sections are secured together by a pair of split clamping members 5 which are connected by bolts 6 which extend through suitable threaded openings in the ears or lugs 7 on the clamping rings. A handle 10 is welded to the lower surface of the lower section 2 of the claw.

Milk is drawn into the claw 1 through a seires of inlet nipples 8, each of which receives a suitable hose attached to a teat cup, not shown. The teat cups are of conventional design and include an inner resilient inflation and an outer rigid shell. The inflation is adapted to receive the teat being milked and vacuum and atmospheric pressure are alternately applied within the space between the inflation and the shell to thereby provide the milking action.

The claw 1 is also provided with an outlet tube 9 which is connected by a suitable hose, not shown, to a pipeline which conducts the milk to a storage location. While the invention is particularly adaptable to pipeline milking systems, it is contemplated that the outlet tube 9 can instead be connected to a floor bucket, and in this case the milk will be collected in the bucket.

According to the invention, a disc 11 and a manifold block 12 are mounted on the claw. The disc 11 and manifold block 12 are secured to the claw by studs 13 which are welded to the upper surface of section 3 and extend through suitable openings in the disc 11 and block 12. Nuts 14 are threadedly engaged with the upper ends of the studs 13.

As best shown in FIG. 4, the upper surface of section 3 is provided with a small opening 15 and the disc 11 is provided with a passage 16 which extends diametrically across the disc and communicates with the vent 15. In addition to passage 16, the disc is also provided with a vertical opening 17 which communicates with passage 16 and slidably receives a valve stem 18. The tip 19 of the valve stem 18 is adapted to seat within the opening 15 and close off the opening.

The valve stem 18 is carried by a diaphragm 20 and is moved vertically toward and away from the opening 15 by the flexing action of the diaphragm 20. The diaphragm 20 is located within a recess 21 or chamber formed in the lower surface of manifold block 12 and is aligned within the recess by engagement of peripheral flange 22 on the diaphragm with an annular groove 23 formed in the block 12. The lower surface of diaphragm 20 is exposed to atmospheric pressure acting through passage 16 while vacuum and atmospheric pressure are alternately applied to the upper surface of the diaphragm by means of a bypass opening 24 which extends between the recess 21 and a passage 25 formed in block 12. In addition to passage 25, the manifold block is also provided with a similar passage 26 and tubes 27 are connected within the passages 25 and 26 and are attached by hoses to a conventional pulsator, not shown. A pair of passages 28 communicate with passage 25, while a pair of passages 29 communicate with passage 26. Tubes 30 are secured within the passages 28 and 29 and receive hoses which are connected to the inflations of the teat cups.

The pulsator is of conventional design and is mounted on a pulsator platform, not shown. The pulsator is adapted to alternately apply a vacuum and atmospheric pressure in the passages 25 and 26. For example, when a vacuum is drawn in passage 25, atmospheric pressure will be applied in passage 26. Conversely, when atmospheric pressure is applied to passage 25, a vacuum will be drawn in passage 26. The structure shown in the drawings is what is commonly called a side-by-side arrangement in which two inflations are connected to vacuum and the other two inflations are connected to atmospheric pressure during the operation rather than vacuum and pressure being applied simultaneously to all inflations. However, the air-bleed mechanism of the invention can also be utilized with the latter system.

In operation, when vacuum is applied to passage 25 the vacuum acts through passage 24 to draw the diaphragm 20 upwardly and lift the tip 19 of the valve stem 18 from the opening 15 thereby permitting a small charge of air to enter the claw 1 through the air passage 16 and opening 15. Simultaneously, the vacuum is applied to both the inside and outside of the inflations connected to passages 28 so that milk flows from the teats associated with these inflations. Subsequently, air is introduced into passage 25 causing diaphragm 20 to flux downwardly and thereby close opening 15 to the claw.

With this construction air is introduced into the milk passageway in synchronization with the pulsator operation. The timing of the introduction of air through vent 15 and the application of vacuum to the inflation is not critical, and as shown in the drawings, the vacuum is applied simultaneously with applying the vacuum to the inflation through passage 25. The air being introduced into the milk passageway imparts a dynamic force on the milk to elevate the same and provide a more uniform milk flow through the passageway to the pipeline.

The invention is primarily useful with a claw-type milker, as shown in the drawings, but it can also be used with a suspended type milker in which the bucket is supported beneath the cow either by a surcingle or a support arm. In addition, the air-bleed apparatus may also be employed in milking devices using a floor bucket. Although the problem of milk elevation is not as pronounced in this type of a system, the hoses may droop and the addition of air into the milk passageway will aid in elevating the milk to the bucket and provide a more uniform milk flow.

By introducing air into the milk passageway, a stronger vacuum differential is maintained at the inflations. Without air being introduced, a smaller vacuum differential is produced at the inflations which reduces the quantity of milk which can be drawn from the teats. This system provides for a positive introduction of a small amount of air and permits less mixing of the air with the milk to thereby minimize rancidity of the milk.

The milk zone, or the interior of the claw, is positively separated from the pulsed vacuum zone, so that no milk can be drawn into the pulsed vacuum passages. This provides a more sanitary operation and eliminates the necessity of cleaning the pulsed passages.

Air is introduced into the claw through the opening 15 which is substantially covered by the disc 11. This construction prevents flies or other insects from being drawn into the opening 15 by the flow of air through the opening.

Various modes of carrying out the invention are contemplated as being within the scope of the following claims particularly pointing out and distinctly claiming the subject matter which is regarded as the invention.

I claim:

1. A milking apparatus, comprising a container having an inlet opening to receive milk and having an outlet opening to discharge milk, said container also having an air inlet opening, a housing associated with the container and defining a diaphragm chamber, a diaphragm mounted within the chamber, said housing having a passageway providing communication between a pulsator and an inflation of a teat cup with the pulsator alternately applying atmospheric pressure and vacuum within the passageway, said housing also including a by-pass port providing communication between the passageway and the chamber to thereby alternately dispose one surface of the diaphragm to pressure and vacuum to flex the diaphragm, means for applying atmospheric pressure to the opposite surface of the diaphragm, a valve member carried by the diaphragm and located outside of the container, said valve member having a portion disposed to open and close the air vent opening in said container, and conduit means for establishing communication between the air vent opening and the atmosphere to permit air to enter said container when the valve member is in the open position.

2. A milking apparatus for intermittently introducing air into a milk passageway, comprising a milk passageway disposed to conduct milk from a teat cup to a storage location and having an air inlet opening therein, a valve member located wholly outside of the milk passageway and disposed to open and close the air inlet opening, a flexible pressure responsive member operably connected to the valve member, means for exposing one surface of the pressure responsive member to atmospheric pressure, and means for exposing the opposite surface of said pressure responsive member alternately to a vacuum and atmospheric pressure whereby said pressure responsive member is flexed to thereby open and close the valve member with respect to the air inlet opening.

3. The structure of claim 2 in which the valve member is an elongated resilient member having a tapered tip disposed to be received within said air inlet opening to close said opening.

4. A milking apparatus, comprising a container having an inlet opening to receive milk and having an outlet opening to discharge milk, said container also having an air inlet opening, a first housing member mounted on the outer surface of said container and having a passage communicating with the air inlet opening and having a valve opening disposed in alignment with said air inlet opening, a second housing member mounted on the first housing member with said housing members having contiguous surfaces and one of said contiguous surfaces having a recess, a diaphragm disposed within the recess with the peripheral edge portion of the diaphragm secured between the contiguous surfaces of said housing members, said second houisng member having a passageway providing communication between a pulsator and an inflation of a teat cup with the pulsator alternately applying atmospheric pressure and vacuum within the passageway, and said second housing member also including a by-pass port providing communication between the passageway and the recess to thereby alternately expose one surface of the diaphragm to a vacuum and atmospheric pressure, means for applying atmospheric pressure to the opposite surface of the diaphragm, and a valve member carried by the diaphragm and located wholly outside of said container, said valve member being slidably disposed within the valve opening and having a tapered tip adapted to be received within the air inlet opening to open and close said opening.

References Cited in the file of this patent

UNITED STATES PATENTS

| | | |
|---|---|---|
| 1,195,998 | Leitch | Aug. 29, 1916 |
| 2,896,573 | Schalm et al. | July 28, 1959 |
| 2,929,354 | Stevens | Mar. 22, 1960 |